Figure 4:
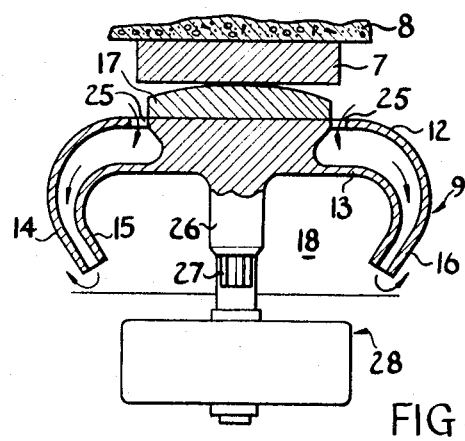

United States Patent

[11] 3,586,141

| [72] | Inventors | Dennis Hennessey<br>London;<br>William Barrie Hart, Southhampton, both of, England |
|---|---|---|
| [21] | Appl. No. | 825,803 |
| [22] | Filed | May 19, 1969 |
| [45] | Patented | June 22, 1971 |
| [73] | Assignee | Tracked Hoovercraft Limited<br>London, England |
| [32] | Priority | Mar. 20, 1968 |
| [33] | | Great Britain |
| [31] | | 23,964/68 |

[54] ELECTRIC PICK-UP DEVICE
12 Claims, 8 Drawing Figs.

[52] U.S. Cl. .................................................. 191/45,
104/23 FS, 191/67
[51] Int. Cl. ........................................................ B60l 5/08
[50] Field of Search ............................................ 191/45, 67,
23; 104/148, 23 FS

[56] References Cited
UNITED STATES PATENTS

| 1,754,016 | 4/1930 | Hershberger................. | 191/67 |
| 1,872,351 | 8/1932 | Schaake et al................ | 191/67 |
| 2,175,008 | 10/1939 | Achenbach et al. .......... | 191/67 |
| 2,175,042 | 10/1939 | Trubenbach ................ | 191/67 |
| 3,356,041 | 12/1967 | Bliss ............................ | 104/23 FS |

*Primary Examiner*—Arthur L. La Point
*Assistant Examiner*—Richard A. Bertsch
*Attorney*—Cameron, Kerkam & Sutton

ABSTRACT: An electrical pickup device particularly for a high-speed electrically propelled vehicle, consists of a shoe which is biased by a continuously generated air cushion against a fixed conductor. The cushion is contained by a gas curtain issuing from an annular nozzle. The cushion acts as a substantially inertia-free spring so that the shoe follows the conductor despite high frequency deflections. The flow of gas cools the shoe. Flowing gas can also guide the shoe laterally.

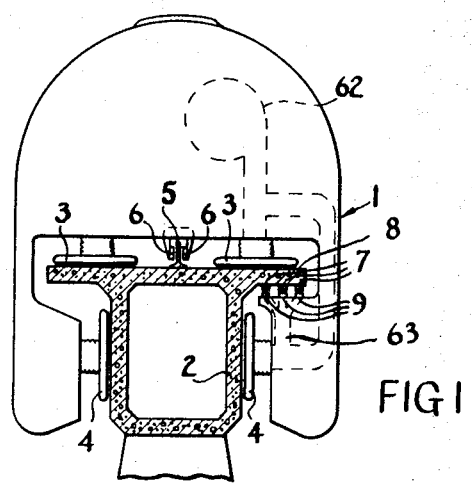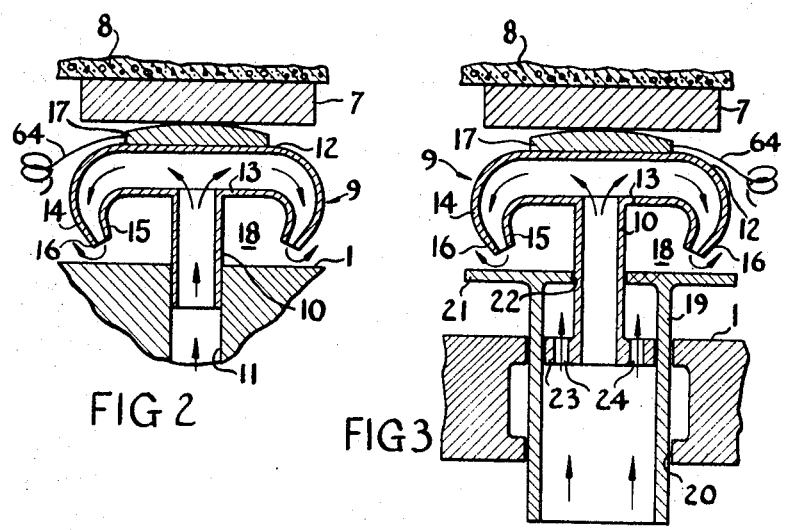

ELECTRIC PICK-UP DEVICE

This invention relates to electric pickup devices for use with vehicles requiring electric power. The invention is particularly applicable to electrically driven vehicles for travelling along a prepared track which guides the vehicle, and especially to such vehicles which are at least partially supported from the track by gas pressure acting on the vehicle. Vehicles of this latter kind are described in British Pat. specifications Nos. 995,127 and 1,002,588, and since they are capable of high speed (e.g. greater than 200 kilometers per hour) a problem exists in collecting electrical current for driving the vehicle. The problem is that, at such high speeds, any irregularity in the level of the electrical conductor from which the vehicle collects current will produce high frequency deflections in the pickup device.

According to the present invention an electrical pickup device for collecting electric current from a conductor includes an electrically conducting shoe which in use contacts the conductor, means for containing a cushion of pressurized gas which in operation biases the shoe against the conductor, and means for continuously supplying gas to the cushion.

In operation it is arranged that the shoe makes electrical connection with the electric load on a vehicle.

The gas cushion effectively forms a substantially inertia-free spring so that during high frequency deflections the shoe will follow the conductor more readily than it would if it was biased by a conventional spring. The flow of gas also serves to cool the shoe.

The means for containing a cushion can be of the plenum chamber type but preferably includes gas outlet means for forming a curtain of moving gas which assists in containing the gas cushion.

In one arrangement the gas outlet means is carried on a member rigidly connected with the shoe and arranged so that the curtain of gas moves generally away from the direction in which the shoe is biased.

In another arrangement the gas outlet means is carried by a member adapted to be connected to the vehicle and arranged so that the curtain of gas moves generally in the direction in which the shoe is biased.

Preferably there is a secondary suspension system through which the shoe can be connected to the vehicle, which may consist of a pantograph.

The device preferably includes means for guiding the shoe laterally with respect to the conductor, and the guiding means preferably uses a flow of gas for operation.

Figure 6:
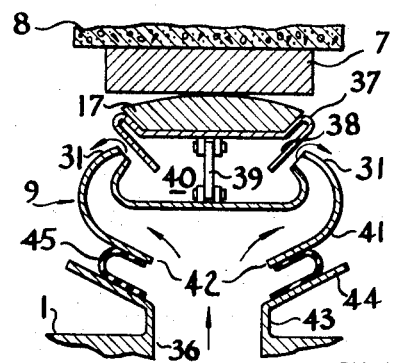
Figure 7:
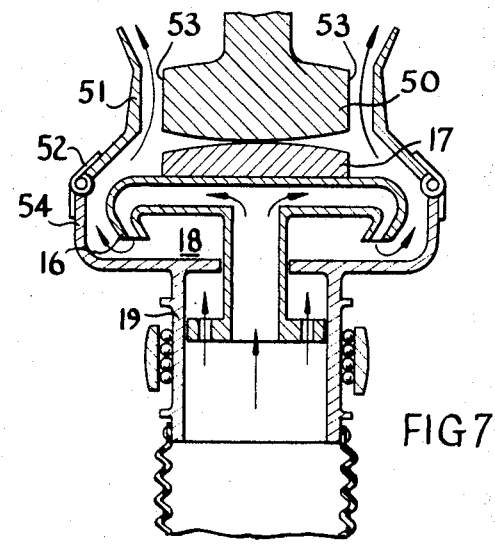
Figure 8:
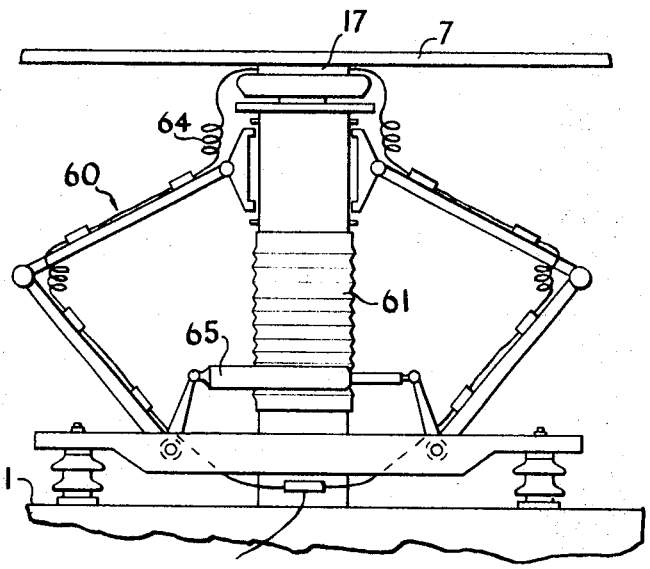

In order that the invention may be well understood various preferred embodiments will now be described with reference to the accompanying drawing in which:

FIG. 1 shows a diagrammatic cross-sectional view through a high-speed vehicle with electrical pickup devices according to the invention, FIGS. 2 to 7 show diagrammatic cross-sectional views of six different pickup devices, and FIG. 8 shows a side view of the device shown in FIG. 3 mounted on a pantograph.

FIG. 1 shows a high-speed vehicle 1 for travelling along a prepared concrete track 2 supported and guided from the track by gas cushions formed by hoverpads 3 and 4 respectively. Gas is fed to the hoverpads by ducts from a fan 62. Vehicles of this kind are described in British Pat. specifications Nos. 995,127 and 1,002,588. The gas cushion pads 3 and 4 are provided with suspension means of the kind described in U.S. Pat. No. 3,477,387. The track 2 carries an upstanding rail 5 which cooperates with two stator parts 6 mounted on the vehicle 1 to form a linear induction motor to drive the vehicle 1.

Three phase electric current is supplied to the vehicle 1 for energizing the stator parts 6 by three conductors 7 which are mounted on the underside of a lateral extension of the track 2 in order to shield them from rain. The current is collected from the conductors 7 by pickup devices 9 which may take any of the forms to be described with reference to FIGS. 2 to 8.

The device 9 shown in FIG. 2 has a tube 10 which slides within a bore 11 in the vehicle 1. The device 9 has two rigidly interconnected wall portions 12 and 13 which enclose a space with which the tube 10 communicates. The wall portions 12 and 13 are circular as seen in plan. The peripheral edges of the wall portions 12 and 13 have respectively wall portions 14 and 15 which are turned towards the vehicle 1 and which form an annular nozzle 16 or gas outlet directed inwardly towards the 10.

The outer surface of the wall portion 12 has an electrically conducting shoe 17 firmly fixed to it.

In operation pressurized gas is continuously supplied to the tube 10 via the bore 11 from the fan 62 on the vehicle 1, via ducts 63. The gas escapes from the device 9 through the nozzle 16 and a curtain of moving gas is thus formed between the nozzle 16 and the vehicle subjacent surface of the 1, as a result of which a cushion 18 of pressurized gas is formed in the space between the wall portion 13 and the subjacent surface of the vehicle 1. In this embodiment of the invention, the subjacent surface of the vehicle 1 may be termed "a reaction member." The nozzle 16 and wall portion 13 constitute means for containing the cushion 18 of gas, and the tube 10 and nozzle 16 constitute means for continuously supplying gas to the cushion. The curtain of pressurized gas issuing from the nozzle 16 assists in containing the cushion 18 in a manner well known in the field of gas cushion vehicle. The cushion 18 is at a lower pressure than the gas issuing from the nozzle 16 but greater than atmospheric pressure and biases the shoe 17 against the conductor 7. The curtain issuing from the nozzle 16 moves generally away from the direction in which the shoe is biased.

The device 9 is free to move towards and away from the vehicle 1, and the cushion 18 acts as a substantially inertia free spring so that the device 9 is capable of following the conductor 7 as the vehicle moves at high speed despite high frequency deflections. The flow of gas through the device 9 also helps to cool the shoe 17 which is heated by friction with the conductor 7. Current is passed from the shoe 17 to the vehicle 1 through an electrical lead 64.

The pickup device 9 shown in FIG. 3 differs from the device 9 of FIG. 2 in that the tube 10 no longer slides within a bore 11 in the vehicle, but slides within a reaction member or sleeve 19 which in turn slides within a bearing 20 in the vehicle 1. The outer end of the sleeve 19 has a plate 21 extending across it with an overlap at the sides. The plate 21 has a central aperture 22 through which the tube 10 extends. The end of the tube 10 within the sleeve 19 has an outwardly projecting flange 23 forming a piston which slides within the sleeve 19. The flange 23 has apertures 24 so that pressurized gas fed from a source in the vehicle 1 passes through the flange 23 and acts against the plate 21 to urge the sleeve 19 away from the vehicle. Pressurized gas also flows through the tube 10 and out of the nozzle 16 to form a curtain of gas directed at the plate 21.

The operation of the pickup device 9 shown in FIG. 3 is similar to that shown in FIG. 2, but has the advantage that the height of the gas curtain issuing from nozzle 16 remains more nearly constant since the sleeve 19 is free to move towards and away from the vehicle 1.

The pickup device 9 shown in FIG. 4 includes two wall portions 12 and 13 with wall portions 14 and 15 forming a nozzle 16 similar to those in FIGS. 2 and 3, but the space between the wall portions 12 and 13 does not communicate with a tube 10. Instead the wall portion 12 has apertures 25 adjacent to shoe 17, and both the wall portions are connected to a central shaft 26 which makes a slidable splined coupling with a shaft 27 which is driven by an electric motor 28 mounted in the vehicle 1. When the motor 28 rotates the shaft 26, air will be drawn into the apertures 25 and expelled centrifugally from the nozzle 16. An air cushion 18 is therefore formed between the device 9 and the subjacent surface or reaction member of the vehicle 1 to urge the shoe 17 against the conductor 7. This arrangement has the advantage that rotation of the shoe 17 whilst in frictional contact with the conductor 7 ensures that good electrical contact is maintained between shoe 17 and conductor 7.

Figure 5:
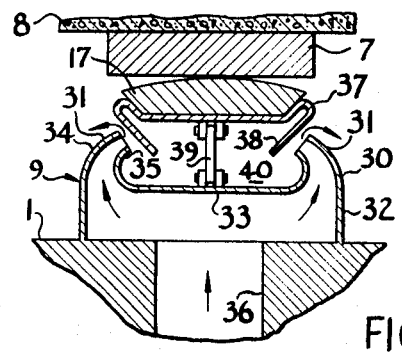

In FIG. 5 a reaction member 30 is connected to the vehicle 1 and an annular gas outlet nozzle 31 is formed on the member 30. The member 30 has an outer cylindrical wall portion 32 and a circular wall portion 33. The nozzle 31 is formed by wall portions 34 and 35 about the periphery of the wall portions 32 and 33, and the nozzle 31 is directed inwardly. Gas is supplied to the space between the wall portions 32 and 33 via a duct 36 in the vehicle from a source of pressurized gas in the vehicle 1.

A shoe 17 is firmly connected to a circular member 37 which has an inwardly inclined wall portion 38 around its periphery. The center of the member 37 is connected to the center of the wall portion 33 by a linkage 39 which allows movement of the shoe 17 towards and away from the vehicle 1. The wall portion 37 is disposed so that in operation a curtain of gas issues from the nozzle 31 at right angles to the wall portion 38. In operation the curtain of pressurized gas will assist in containing a cushion 40 of pressurized gas which biases the shoe 17 against the conductor 7. The curtain of gas issuing from the nozzle 31 moves generally in the direction in which the shoe 17 is biased. The linkage 39 not only serves to secure the member 37 to the vehicle but can also be used to form the electrical connection between the shoe 17 and the electric load on the vehicle 1 although the lead 64 can be used for this as above described.

The pickup device shown in FIG. 5 has the advantage over those previously described in that the weight of the part which is biased against the conductor can be made very small so that the shoe 17 can very easily follow the conductor despite high frequency deflections.

The pickup device 9 shown in FIG. 6 is similar to that shown in FIG. 5 except that instead of the member 30 being directly connected to the vehicle 1 a reaction member 41 is connected to the vehicle through a secondary suspension system described below (the air cushion 40 of course acting as a primary suspension system).

The reaction member 41 has an inclined annular wall 42 and a member 43 connected to the vehicle 1 has an inclined annular wall 44. An annular flexible membrane 45 interconnects the walls 42 and 44 and under the action of pressurized gas supplied through the duct 36 forms a concave surface as seen from within the member 43. The membrane 45 will progressively engage the wall 42 as the member 41 moves towards the vehicle 1 thus increasing the stiffness of the suspension.

The pickup device 9 shown in FIG. 7 differs from the device shown in FIG. 3 in that it includes means for guiding the shoe 17 laterally with respect to the conductor 50. There are members 51 urged by springs 52 towards the sides 53 of the rail 50. The members 51 are connected to extensions 54 of the reaction member or sleeve 19. Gas escaping from the cushion 18 flows out between the spring urged members 51 and the conductor 50 and thus guides the shoe 17 laterally. At high speed therefore the shoe 17 is guided but there need only be occasional contact between the members 51 and the sides 53 of the rail.

FIG. 8 shows the device of FIG. 3 connected to the vehicle 1 through a pantograph 60 of known type which acts as a secondary suspension system. It is to be understood that any of the devices shown in the other FIGS. could be mounted on the pantograph 60. Air is fed to the cushion from the fan 62 (FIG. 1) via a flexible duct 61. A spring or jack 65 biases the shoe 17 towards the conductor, so that current is collected for energizing the fan 62 before pressurized gas can be supplied to the device.

We claim:

1. An electrical pickup device adapted to be carried by a moving vehicle for collecting electric current from a stationary conductor, comprising a reaction member movable with the vehicle generally parallel to the conductor in spaced relation thereto, a contact member carried by the vehicle and movable relative to the reaction member towards and away from the conductor, the contact member having an electrically conductive portion for contacting the conductor in current transfer relationship, the reaction member and the contact member presenting to one another mutually opposed spaced surfaces, and means for forming and containing in the space between the opposed surfaces a cushion of gas at a pressure greater than atmospheric pressure despite the escape of gas between the reaction member and the contact member around the periphery of the cushion, said cushion forming and containing means comprising gas outlet means for forming a curtain of moving gas between the reaction member and the contact member around the periphery of the cushion, and means for continuously supplying pressurized gas to the gas outlet means, the cushion serving to bias the contact member relatively to the reaction member and to urge the electrically conductive portion of the contact member into contact with the conductor.

2. A device as claimed in claim 1, wherein the cushion forming and containing means are carried by the contact member.

3. A device as claimed in claim 1, wherein the cushion forming and containing means are carried by the reaction member.

4. A device as claimed in claim 1, wherein the curtain of moving gas between the reaction member and the contact member around the periphery of the cushion is directed inwardly thereof, at least in part to form the gas cushion.

5. A device as claimed in claim 1, wherein the contact member is rotatable about an axis generally perpendicular to the conductor and the gas outlet means are carried by the contact member, the gas supply means comprising a gas port in the contact member open to atmosphere and a passage formed in the contact member and extending in an outward direction towards the gas outlet means, and which includes motor means for rotating the contact member whereby air is centrifugally drawn in through the gas port and is expelled through the gas outlet means.

6. A device as claimed in claim 1, which includes guidance means for directing gas leaving the cushion to pass laterally of the conductor on either side of the contact member, whereby to provide lateral guidance of the contact member with respect to the conductor.

7. A device as claimed in claim 6, wherein the guidance means comprise members resiliently connected to the reaction member extending past the contact member on either side of the conductor and in spaced relation thereto.

8. A device as claimed in claim 1, wherein the reaction member is movable relative to the vehicle towards and away from the conductor, and which includes means for biasing the reaction member towards the conductor relatively to the vehicle.

9. A device as claimed in claim 8, wherein gas supply means continuously supplies pressurized gas to the space between the opposed surfaces of the reaction member and the contact member, and the reaction member is subject to the pressure of gas in the gas supply means so as to be biased towards the conductor relatively to the vehicle.

10. A device as claimed in claim 9, wherein the reaction member is formed with a bore closed at its end adjacent the conductor and the contact member comprises a stem portion formed with a gas passage therethrough and extending away from the electrically conductive portion through the said closed end of the reaction member, the stem portion having fixed thereto a piston slidable within the bore, the gas supply means comprising, in series, the gas passage through the stem portion of the contact member and the bore of the reaction member at the side of the piston remote from the conductor, and the piston including an opening therein through which pressurized gas may flow into the bore of the reaction member between the closed end of the bore and the piston.

11. A device as claimed in claim 8 which includes a tubular flexible member connected between the reaction member and the vehicle and arranged to form part of the gas supply means.

12. A device as claimed in claim 11, wherein the tubular flexible member comprises a rolling diaphragm arranged progressively to engage at its outside surface an inclined contacting surface of the vehicle, whereby to provide stiffness for the mounting of the reaction member, and thereby the contact member, on the vehicle.